May 13, 1941.                H. THOMA                    2,241,651
                          HYDRAULIC DEVICE
                       Filed April 17, 1939          2 Sheets-Sheet 1
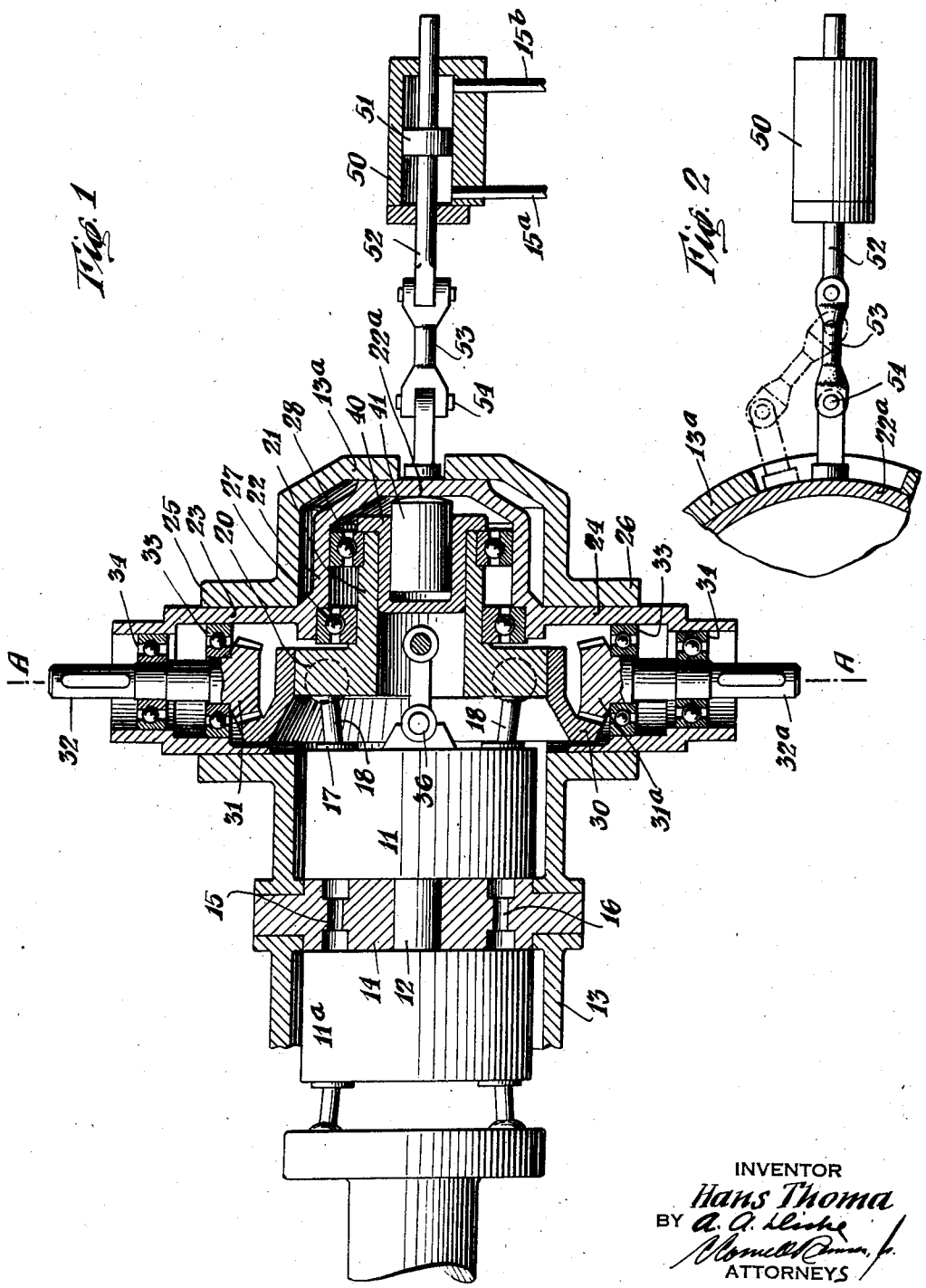
INVENTOR
Hans Thoma
BY
ATTORNEYS May 13, 1941.   H. THOMA   2,241,651
HYDRAULIC DEVICE
Filed April 17, 1939   2 Sheets-Sheet 2
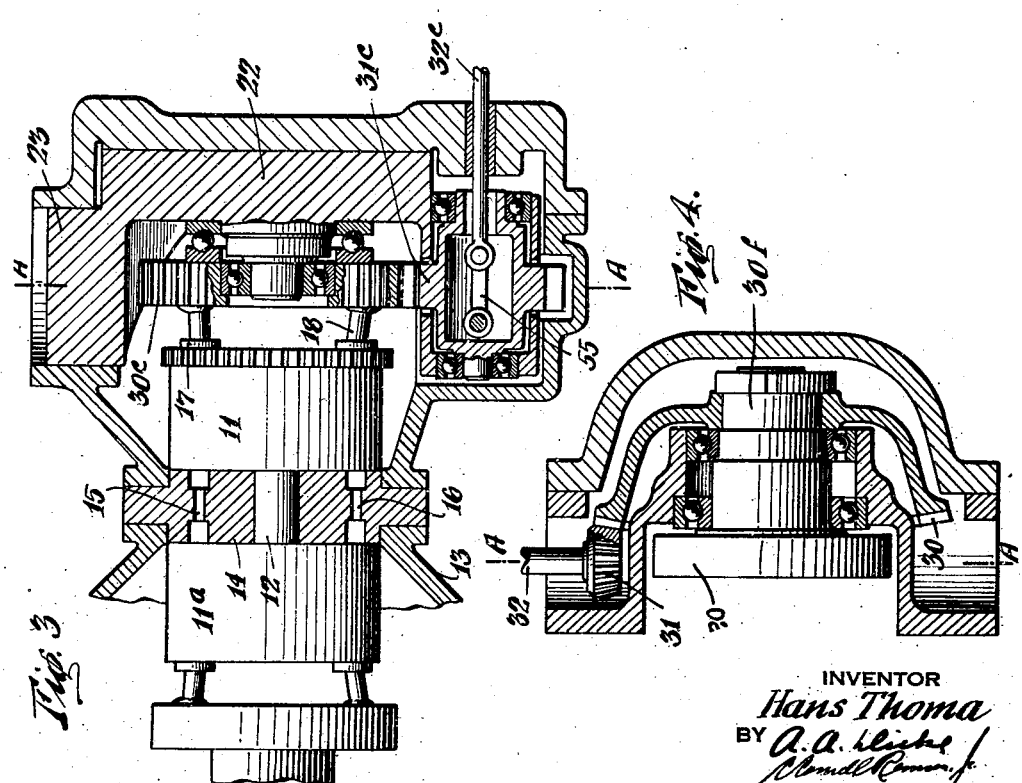
INVENTOR
Hans Thoma
BY
ATTORNEYS Patented May 13, 1941

2,241,651

UNITED STATES PATENT OFFICE 2,241,651

HYDRAULIC DEVICE

Hans Thoma, Karlsruhe, Baden, Germany

Application April 17, 1939, Serial No. 268,289
In Germany February 21, 1938

10 Claims. (Cl. 103—162)

This invention relates to hydraulic devices and has for an object to provide an improved variable volume pump or hydraulic motor.

It is an object of the present invention to improve hydraulic pumps and/or motors, which will be hereinafter referred to as hydraulic displacement devices, of the type in which a cylinder block rotates about a relatively fixed axis and in which the driving flange for operating pistons in cylinder bores in said cylinder block is mounted for oscillation about an axis at an angle to the axis of said cylinder block, a particular object of the invention being to provide means for applying power to or to arrange for the delivery of power from said driving flange without the use of a universal joint or equivalent means.

A more specific object is to provide gearing between the shaft and the drive flange so arranged that the drive flange may be oscillated without affecting the interengagement of the gears.

Another object is to provide means for balancing the torque reaction applied to the driving flange by the power input gearing.

Other objects will become apparent from the following description taken in connection with the attached drawings showing several illustrative embodiments of the invention and wherein:

Fig. 1 is a cross-sectional view of a hydraulic displacement device illustrating the invention, a bevel gear drive being employed;

Fig. 2 is a view at right angles to that of Fig. 1 showing a detail;

Fig. 3 is a view similar to Fig. 1 showing a modification in which a spur gear drive is employed;

Fig. 4 illustrates a further modification somewhat similar to Fig. 1.

Referring to the drawings, the numeral 11 indicates a cylinder block mounted for rotation as upon a shaft 12 which may be stationarily mounted in a housing 13 which, as shown, is formed with a valve plate 14 having ports 15 and 16 (shown displaced 90° from their actual position) communicating either with intake and delivery pipes or as in the form shown with a second cylinder block 11a, which may be a part of a hydraulic motor of similar construction. Cylinders 11 and 11a are provided with cylinder bores in which operate pistons as 17 driven by piston rods 18 one end of each of which is spherically connected with a piston and their other ends are connected with the driving flange 20 in the usual manner. The driving flange is provided with a bearing extension 21 which is rotatably supported within a cylindrical housing 22 forming a part of a swingable support having an upper extension 23 and a lower extension 24 journaled within the sleeve bearings 25 and 26 forming a part of the housing of the device.

Ball bearings 27 and 28 are preferably provided to reduce the friction. One or both of these bearings may also be constructed as a thrust bearing to support the driving flange 20 against the thrust of the piston rods. Other thrust elements will be described later.

The driving flange 20 is shown provided with a ring gear 30 provided in the form shown with bevel gear teeth which mesh with a bevel pinion 31 mounted on shaft 32 and journaled as by ball bearings 33 and 34 in the cylindrical bearing extension 23. If desired, a second bevel pinion 31a may be provided supported on shaft 32a.

It will be seen that the driving flange 20 may be oscillated about the axis A—A since the support journals 23 and 24 oscillate about said axis A—A. It will also be noted that the shaft 32 and 32a if employed) rotates about the same axis. Therefore, the driving flange may be rocked about the axis A—A without in any way interfering with the meshing of gear 31 with the ring gear 30. Therefore, the driving flange may be rocked at will by any suitable means to vary the displacement per revolution of the hydraulic device from zero to a maximum in either direction; this being accomplished without the use of a universal joint or other similar inefficient and unreliable means.

The small amount of torque required to keep the cylinder running in synchronism with the driving flange may be transmitted by a small light universal joint 36, or this may be entirely omitted and the engagement of the piston rods 18 with the inner surfaces of the pistons 17 may serve to keep said parts operating in synchronism.

In order to relieve the ball bearings 27, 28, of thrust, it may be desirable to provide a hydraulic thrust bearing. This may be readily accomplished by providing the driving flange with a cylinder 40 within which operates a piston 41, the outer end of which bears against the outer wall 22a of the member 22. Pressure oil, such as the pressure existing in the delivery conduits, is conducted to the space between the piston 41 and the head of cylinder 40 so that a counterbalancing force proportional to the oil pressure and therefore proportional to the thrust is provided.

The outer surface of the wall 22a is preferably made cylindrical about the axis A—A and to bear against a similar cylindrical surface formed on the inner side of the end wall 13a of the housing. In this way great rigidity is provided and the load on the journals 23, 24 reduced to a minimum.

The device described thus far has the characteristic that the driving torque of shaft 32 and bevel pinion 31 is applied to the driving flange and tends to rotate it about its axis of adjustment. While this is not objectionable in most cases it is disadvantageous where an automatic volume control device is employed. Various means may be used to compensate for this torque as by duplicating the driving members 31 and 32, as shown in Fig. 1, it being understood that the pinions 31 and 31a are driven in opposite directions by any suitable means such as two separate electric motors, so constructed and connected as to deliver the same torque, or by mechanical differential gearing. If it is, however, not desired to duplicate the driving connections, compensation may be effected by the means shown in the right hand portion of Fig. 1 and in Fig. 2. Therein, a cylinder 50 is employed provided with a piston 51, the opposite sides of which are subjected to pressure applied through conduit 15a and 15b connected respectively with the conduits 15 and 16, by suitable conduits, not shown. The resulting pressure acting upon piston 61 will therefore be the difference between the delivery pressure and the intake pressure. Through piston rod 52 and link 53, which is pivotally connected as at 54 with the member 22, a torque is applied to the swingable drive flange support 22 in such a manner as to counterbalance the torque applied thereto by shaft 32 and bevel pinion 31.

The form shown in Fig. 3 is quite similar to that shown in Fig. 1 with the difference however that the driving flange is formed with a spur ring gear 30c with which meshes the spur pinion 31c mounted in suitable ball bearings within the swingable drive flange support member 22. Its axis of rotation does however not coincide with the axis of oscillation A—A of the drive flange. Therefore, it is necessary to provide a universal joint 55 or equivalent means between the power input (or delivery) shaft 32c and the spur pinion 31c to permit of the necessary relative movement. This universal joint 55 is preferably of the double compensating or other uniform speed type. While a universal joint is used, it may be of relatively small dimensions because of the low torque due to gear ratio employed.

Fig. 4 shows a construction similar to Fig. 3 with the difference however that the spur pinion 31c is driven by means of a pair of bevel gears, viz., 31d and 31e, the latter of which is located in the axis of oscillation A—A of the driving flange support.

Fig. 4 shows a view similar to that of Fig. 1 with the main difference however that the bevel gear 30 instead of being directly connected with the drive flange is connected with the drive flange journal as at 30f.

Whereas the device is frequently referred to herein as a pump driven by an outside source of power, it is to be understood that it may at will be employed as a hydraulic motor, receiving energy in the form of fluid under pressure and delivering the energy through one or more shafts such as 32.

It will be noted that the constructions shown and described will serve admirably to accomplish the objects stated above. It is to be understood however, that the constructions disclosed above are intended merely as illustrative of the invention and not as limiting as various modifications therein may be made without departing from the invention as defined by a proper interpretation of the claims which follow.

I claim:

1. In a hydraulic displacement device, a rotatable cylinder block formed with cylinder bores, pistons in said bores, piston rods connected to said pistons, the other ends of said piston rods being all connected to a rotatable driving means, a support upon which said driving means is journaled, said support being journaled for oscillation about an axis which intersects and is located at an angle to the axis of rotation of said cylinder block, and gearing means for rotating said driving means including a gear attached to said driving means and a gear meshing with said first mentioned gear, said gearing means being so constructed and arranged that said support may be oscillated about its axis without altering the meshing of said gearing.

2. The combination of claim 1 wherein said gearing comprises bevel gears one of which is carried by said driving means and the other of which is mounted for rotation upon the axis of oscillation of said support.

3. In a hydraulic displacement device, a rotatable cylinder block formed with cylinder bores, pistons in said bores, piston rods connected to said pistons, the other ends of said piston rods being all connected to a rotatable driving means, a support upon which said driving means is journaled, said support being journaled for oscillation about an axis at an angle to the axis of rotation of said cylinder block, and gearing means for rotating said driving means comprising a gear connected for driving said driving means and a second gear meshing with said first gear and supported for rotation upon the axis of oscillation of said support, whereby said support may be oscillated without disengaging said gearing.

4. The combination of claim 3 wherein said gearing comprises bevel gears one of which is carried by said driving means and the other of which is mounted for rotation upon the axis of oscillation of said support.

5. The combination of claim 1 wherein said gearing comprises a spur gear upon said driving means, a second spur gear meshing therewith carried by said support and connected with a bevel gear and a second bevel gear meshing with said first bevel gear and journaled for rotation upon the axis of oscillation of said support.

6. The combination of claim 1 wherein said gearing comprises a spur gear upon said driving means, a second spur gear meshing therewith carried by said support and means for driving said second spur gear.

7. The combination according to claim 3 together with means for counterbalancing the torque reaction of said second gear upon said driving means and its support.

8. The combination according to claim 3 together with means for counterbalancing the torque reaction of said second gear upon said driving means and its support comprising a second driving gear for said first gear located in said axis of oscillation diametrically opposite the first driving gear.

9. The combination according to claim 3 together with means for counterbalancing the torque reaction of said second gear upon said driving means and its support comprising a hydraulic means operated by the net fluid pressure in said hydraulic device and connected to said support for counterbalancing said driving torque.

10. The combination according to claim 3 together with means for counterbalancing the torque reaction of said second gear upon said driving means and its support comprising a hydraulic means operated by the net fluid pressure in said hydraulic device and connected to said support for counterbalancing said driving torque comprising a cylinder, a piston therein and a linkage connecting said piston to said support.

HANS THOMA.